United States Patent [19]

Seberger et al.

[11] Patent Number: 5,502,999
[45] Date of Patent: Apr. 2, 1996

[54] ELECTRO-PNEUMATIC CONVERTER CALIBRATION

[75] Inventors: Stephen G. Seberger; Bruce F. Grumstrup; George W. Gassman, all of Marshalltown, Iowa

[73] Assignee: Fisher Controls International, Inc., Clayton, Mo.

[21] Appl. No.: 305,573

[22] Filed: Sep. 14, 1994

Related U.S. Application Data

[63] Continuation of Ser. No. 956,918, Oct. 5, 1992, abandoned.

[51] Int. Cl.$^6$ ............................................... G01C 17/38
[52] U.S. Cl. ........................................................ 73/4 R
[58] Field of Search ................. 73/4 R, 4 D; 364/571.01, 364/571.04

[56] References Cited

U.S. PATENT DOCUMENTS

| | | | |
|---|---|---|---|
| 3,740,533 | 6/1973 | Zeggelaar | 73/4 R |
| 4,142,420 | 3/1979 | Maeda et al. | 73/728 |
| 4,192,005 | 3/1980 | Kurtz | 364/571 |
| 4,384,925 | 5/1983 | Stetter et al. | 204/1 T |
| 4,386,626 | 6/1983 | Hehl | 137/529 |
| 4,418,392 | 11/1983 | Hata | 364/571 |
| 4,468,968 | 9/1984 | Kee | 73/708 |
| 4,512,179 | 4/1985 | Umble et al. | 73/4 R |
| 4,513,782 | 4/1985 | Contartese et al. | 137/625.63 |
| 4,576,035 | 3/1986 | Hooven et al. | 73/4 R |
| 4,644,482 | 2/1987 | Juanarena | 364/558 |
| 4,665,938 | 5/1987 | Brown et al. | 137/85 |
| 4,677,581 | 6/1987 | Malka et al. | 364/571 |
| 4,679,162 | 7/1987 | Ferber et al. | 364/571 |
| 4,720,800 | 1/1988 | Suzuki et al. | 364/510 |
| 4,866,640 | 9/1989 | Morrison, Jr. | 364/558 |
| 4,872,124 | 10/1989 | Shimizu et al. | 364/571.03 |

(List continued on next page.)

FOREIGN PATENT DOCUMENTS

| | | |
|---|---|---|
| 0075507A1 | 3/1983 | European Pat. Off. . |
| 0280808A1 | 7/1988 | European Pat. Off. . |
| 0294918A2 | 12/1988 | European Pat. Off. . |
| 3931962A1 | 4/1991 | Germany . |
| WO85/05710 | 12/1985 | WIPO . |
| WO89/03019 | 4/1989 | WIPO . |

OTHER PUBLICATIONS

*Patent Abstracts of Japan*, vol. 17, No. 464 (P–1599) 24 Aug. 1993 & JP–A–05 108 166 (Yamatake Honeywell Co. Ltd.) 21 Jan. 1991.
"Smart Valve Positioner", Shunichiro Awa, et al., Factory System Operation Division, pp. 1–13.
"Siemens Sipart® PS 6DR3000–1 N/E–2N/E", *Siemens AG 1991*, pp. 1, 30–58.
"Smart Electronic Transmitters Type BCN", *Bailey Product Specification E21–30*, Bailey Controls, pp. 73–136.
"821 Intelligent Pressure Transmitters", *Product Specifications PSS 2A–1A1C*, 1988 by The Foxboro Company, pp. 1–16.
"Model 1151 Smart Pressure Transmitters", *Product Data Sheet PDS 4593*, Dec. 1992, Rosemount Measurement Control Analytical Valves, pp. 1–8.
"ST 3000 Smart Field Instrumentation", *Honeywell*, pp. 1–16.

*Primary Examiner*—Robert Raevis
*Attorney, Agent, or Firm*—Marshall, O'Toole, Gerstein, Murray & Borun

[57] ABSTRACT

A temperature compensation method for a microprocessor based electro-pneumatic converter device including an initial calibration sequence, a compensation sequence, and an operation sequence. Linearization of an electro-pneumatic positioner including the steps of adjusting the positioner feedback linkage until a predetermined reference position is attained, reading a position feedback value and determining the required feedback linearization value to achieve a linear relationship between the output/input. A calibration method and a configuration method independent of calibration for a microprocessor based electro-pneumatic converter device including an initial calibration sequence, a configuration sequence, and an operation sequence.

15 Claims, 7 Drawing Sheets

U.S. PATENT DOCUMENTS

| | | | |
|---|---|---|---|
| 4,908,760 | 3/1990 | Sinn | 364/400 |
| 4,931,967 | 6/1990 | Boe et al. | 364/571.01 |
| 4,947,355 | 8/1990 | Koeman | 364/571.01 |
| 4,970,670 | 11/1990 | Twerdochlib | 364/571.03 |
| 4,976,144 | 12/1990 | Fitzgerald | 73/168 |
| 4,991,127 | 2/1991 | Crookshanks | 364/571.04 |
| 5,012,415 | 4/1991 | Boe et al. | 364/424.07 |
| 5,018,087 | 5/1991 | Dannenberg | 364/571.01 |
| 5,038,305 | 8/1991 | Kumar et al. | 364/571.01 |
| 5,051,937 | 9/1991 | Kawate et al. | 364/571.01 |
| 5,062,446 | 11/1991 | Anderson | 137/468 |
| 5,065,611 | 11/1991 | Angelosanto et al. | 73/4 R |
| 5,070,732 | 12/1991 | Duncan et al. | 73/431 |
| 5,089,979 | 2/1992 | McEachern et al. | 364/571.04 |
| 5,109,692 | 5/1992 | Fitzgerald | 73/168 |
| 5,135,002 | 8/1992 | Kirchner et al. | 128/672 |
| 5,179,330 | 1/1993 | Nikolaus | 318/567 |

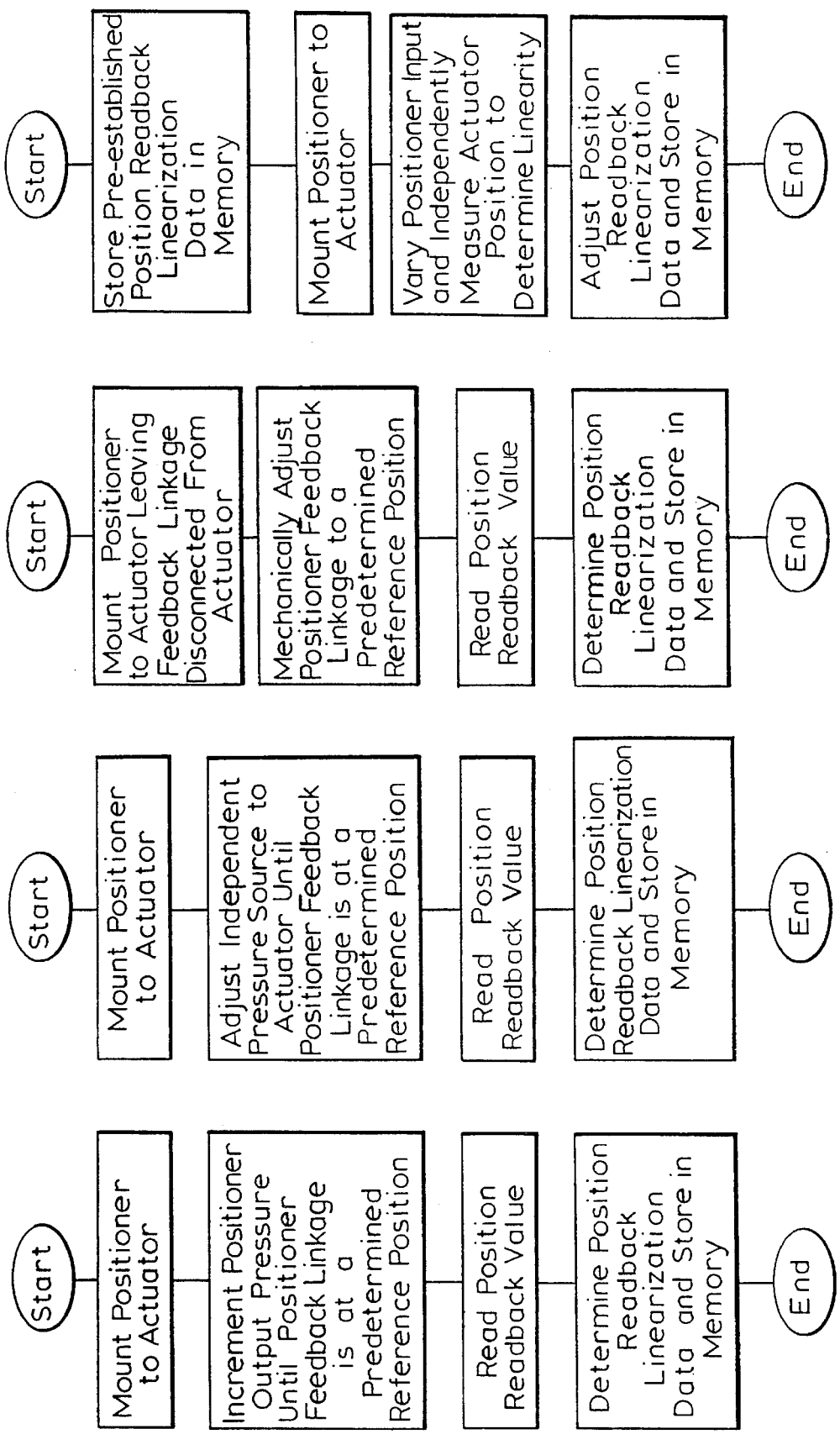

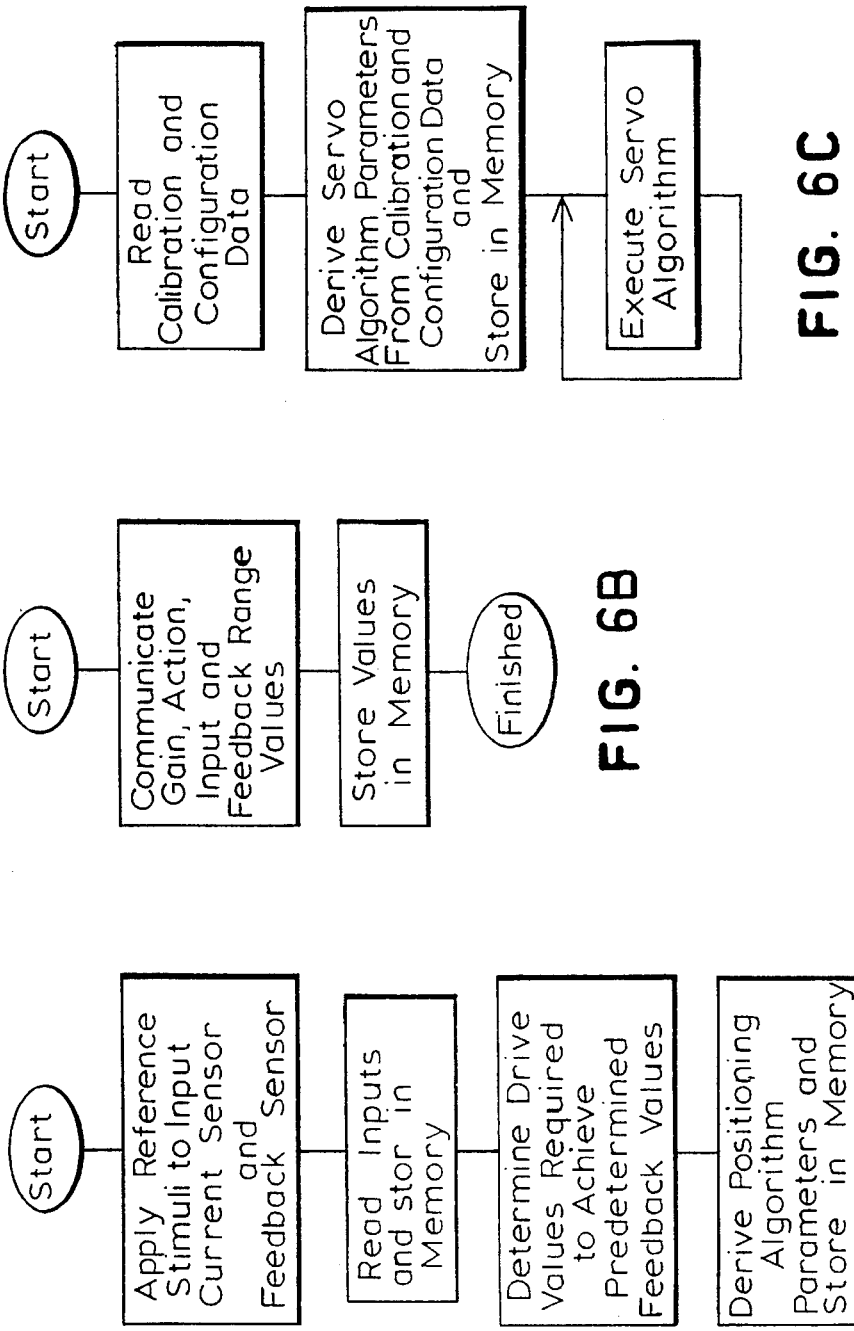

ELECTRO-PNEUMATIC CONVERTER CALIBRATION

This is a continuation of application Ser. No. 07/956,918, filed Oct. 5, 1992, now abandoned.

This invention relates to electro-pneumatic converter devices and in particular to microprocessor based current to pressure transducer/positioner devices.

BACKGROUND OF THE INVENTION

Electro-pneumatic converters, such as current to pressure transducers are in common use as field instruments mounted in pipeline systems for controlling the process fluid. Accordingly, these devices are installed in potentially hazardous explosive environments as well as a variety of temperature conditions. Such devices generally receive a variable electrical input signal (i.e. a variable current input signal of between 4–20 mA or a variable voltage input signal of between 1–5 V) and eventually provide a variable pressure output to an actuator for a fluid control valve or other similar control device.

There are presently existing current to pressure transducers which employ various temperature compensation circuits which typically use the temperature effect on certain circuit components to counteract the temperature effects on other circuit components. While this form of temperature compensation may be sufficient in a limited number of circumstances, it is not sufficient in the majority of applications because the compensation required is a complex function of the temperature. Accordingly, it has been desired to provide temperature compensation of all functions of an electro-pneumatic device, such as a current to pressure transducer or positioner.

In addition, such electro-pneumatic devices require calibration which entails making manual mechanical adjustments to linkages or potentiometers or some combination thereof, typically on the "bench", before installation of the units, to attain a degree of static accuracy. Normally, for instance, there is a linearly moving valve actuator arm and a non-linearly moving position sensing device (a rotating potentiometer, for instance) which are joined by a positioner feedback linkage. When mounting these units in the field, any slight misalignment between the benchset and the field mounting will reduce the linearity and therefore the accuracy of the device in operation.

Furthermore, to initially calibrate or to recalibrate such electro-pneumatic devices, it is required that covers and protective elements of the device be removed to allow access to the adjusting components. This can be inconvenient, particularly in the case of explosion proof installations that require a major effort to obtain permission from the plant supervisor so that the explosion proof seals and joints can be violated while making the necessary adjustments. Another potentially damaging aspect is that every time the device needs recalibrating, the internal components will be exposed for a period of time to the plant environment in which the device is located. This can lead to degradation of the components and eventual reduction in the reliability of the device.

Accordingly, it is desired to provide an improved microprocessor based electro-pneumatic device which can be adapted for calibration purposes. It is further desired to enable remote calibration of the microprocessor based electro-pneumatic device so that no mechanical adjustments or intrusions to the inside of the instrument need to be made for recalibration. It is also desired to provide an easier more flexible method of initially calibrating the device or to accommodate a wider range of process control applications to which the device might be utilized.

Another desire is to provide an improved microprocessor based electro-pneumatic device which can be used to compensate for potential non-linearities introduced when the device is being field mounted.

It is another desire to provide an electropneumatic device which may be calibrated with greater accuracy and wherein no inaccuracy is added to the linearization process such as presently occurs in prior art linearization procedures.

SUMMARY OF THE INVENTION

A microprocessor based current to pressure transducer or positioner is provided with temperature compensation of all input functions. In another aspect of the invention, an electro-pneumatic positioner is provided with post-mounting linearization capability. In still another aspect of the invention, an electropneumatic converter device is provided with simplified calibration and with configuration independent of calibration.

In accordance with the principles of one aspect of the present invention, there is provided a temperature compensation of all input functions of a current to pressure transducer or positioner where the internal temperature and input functions are all measured at various points over the specified operating range and compensation values are stored. Thus, a table of compensation values is developed and stored with known calibration temperature relationships. In operation, the instrument can thus correct for all temperature effects and perform better than similar units with other type of temperature compensation.

In accordance with this aspect of the present invention, there is provided a temperature compensation method for an electro-pneumatic converter device having a microprocessor receiving an electrical input signal and a pressure or position sensor coupled to the microprocessor for providing an output feedback signal to the microprocessor. The temperature compensation method is provided in three sequences, i.e., (1) a calibration sequence in which correction values for predetermined inputs to the electro-pneumatic converter device are obtained for corresponding specific temperatures, (2) a compensation sequence in which an active correction value is determined and stored for a particular electrical signal input, and (3) an operation sequence wherein the active correction value is read from the memory and applied to the signal input to provide a corrected input signal for operating the device.

In accordance with another aspect of the invention, a post mounting linearization method for an electro-pneumatic converter device such as a positioner ("post mounting" referring to the mechanical assembly or mounting of the positioner to the valve actuator). In accordance with this aspect of the present invention, a post mounting linearization method is provided to linearize the output of the feedback sensor normally associated with a rotating potentiometer in non-linear movements with respect to movements of a linearly moving valve actuator stem, where the feedback sensor potentiometer and the valve stem are interconnected by a positioner feedback linkage. In particular, the linearization method of the present invention includes mounting one end of the positioner feedback linkage to the non-linearly moving feedback position sensor and the other end of the positioner feedback linkage to the linearly moving fluid valve stem. The position of the feedback linkage is then adjusted to a predetermined reference position. A position feedback value is then read from the feedback position sensor and a position feedback linearization reference value is determined sufficient to align a compensation algorithm to the feedback linkage non-linearity and to thereby linearize the configuration, with the reference value being stored in memory. The compensation algorithm required is determined by the specific feedback linkage geometry and is easily derived by one skilled in the art.

Adjusting of the position of the positioner feedback linkage to a predetermined reference position can be provided by incrementing the positioner output pressure utilizing the electrical signal input until the predetermined reference position is reached; or adjusting an independent pressure source to the actuator until the positioner feedback linkage is at the predetermined reference position; or mechanically adjusting the positioner feedback linkage to the predetermined reference position.

Alternatively, the linearization can be provided by initially storing a pre-established position feedback linearization value in memory; mounting the positioner to the actuator; varying the positioner electrical signal input and independently measuring the actuator position to determine linearity; and adjusting the position feedback linearization data as required and storing this value in memory.

In accordance with still another aspect of the present invention, a positioner or transducer is provided with ease of calibration and with configuration independent of calibration. In particular, simplified calibration is provided for an electro-pneumatic positioner so that the normal range of electrical input signals will be converted to a calibrated range of output pressure signals. In particular, in accordance with the calibration method of the present invention, an electrical signal input is applied to the I/P transducer/positioner and the corresponding values for the signal input and the pressure output are stored in memory. Drive values are determined on the basis of values required to achieve predetermined feedback values, and from such information positioning algorithm parameters are derived and stored in memory. This process effectively calibrates the device using control signals and can be accomplished in a remote manner without requiring adjustment of the mechanical components.

In the configuration independent of calibration method of the present invention, the electro-pneumatic converter device receives an electrical signal used to control a pneumatic output pressure or position where the input signal range or pneumatic output pressure or position range can be changed without recalibration of the device. In particular, a table of values is developed with known calibration relationships between the input signals and the output of the electro-pneumatic converter device. The table of values can be manipulated by the user such that the relationship between the input and the output values can be modified using a scaler without changing the known calibration relationships. Furthermore, the gain of the algorithm used to control the pneumatic output pressure or position of the device can be changed without requiring recalibration of the control device.

In particular, after calibration of the positioner or transducer has been achieved as previously described above, a configuration sequence is utilized wherein the gain, action, input and feedback range values are inserted and stored for the particular device. In an operation sequence, the calibration values stored in the calibration sequence and the configuration values stored in the configuration sequence are read, and from these values active servo algorithm parameters are developed and used.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIGS. 5A–5D are information flow diagrams showing the steps involved in alternative methods for providing post mounting linearization in accordance with another aspect of the present invention; and FIG. 6(a–c) is an information flow diagram showing the steps for calibrating and automatically recalibrating a current to pressure transducer/positioner in accordance with still another aspect of the present invention.

DETAILED DESCRIPTION

The present invention is illustrated and will be described in connection with a preferred embodiment comprising a current to pressure transducer/positioner. It is to be understood that the teachings herein can as well be applied to other electro-pneumatic converter devices to solve problems similar to those which are solved by the present invention. Accordingly, the present invention is to be understood to be for purposes of describing the preferred embodiment and is not meant to limit the scope of the invention in the claims. Thus, the invention and the claims are to be given a broad interpretation consistent with the teachings herein.

Figure 1:
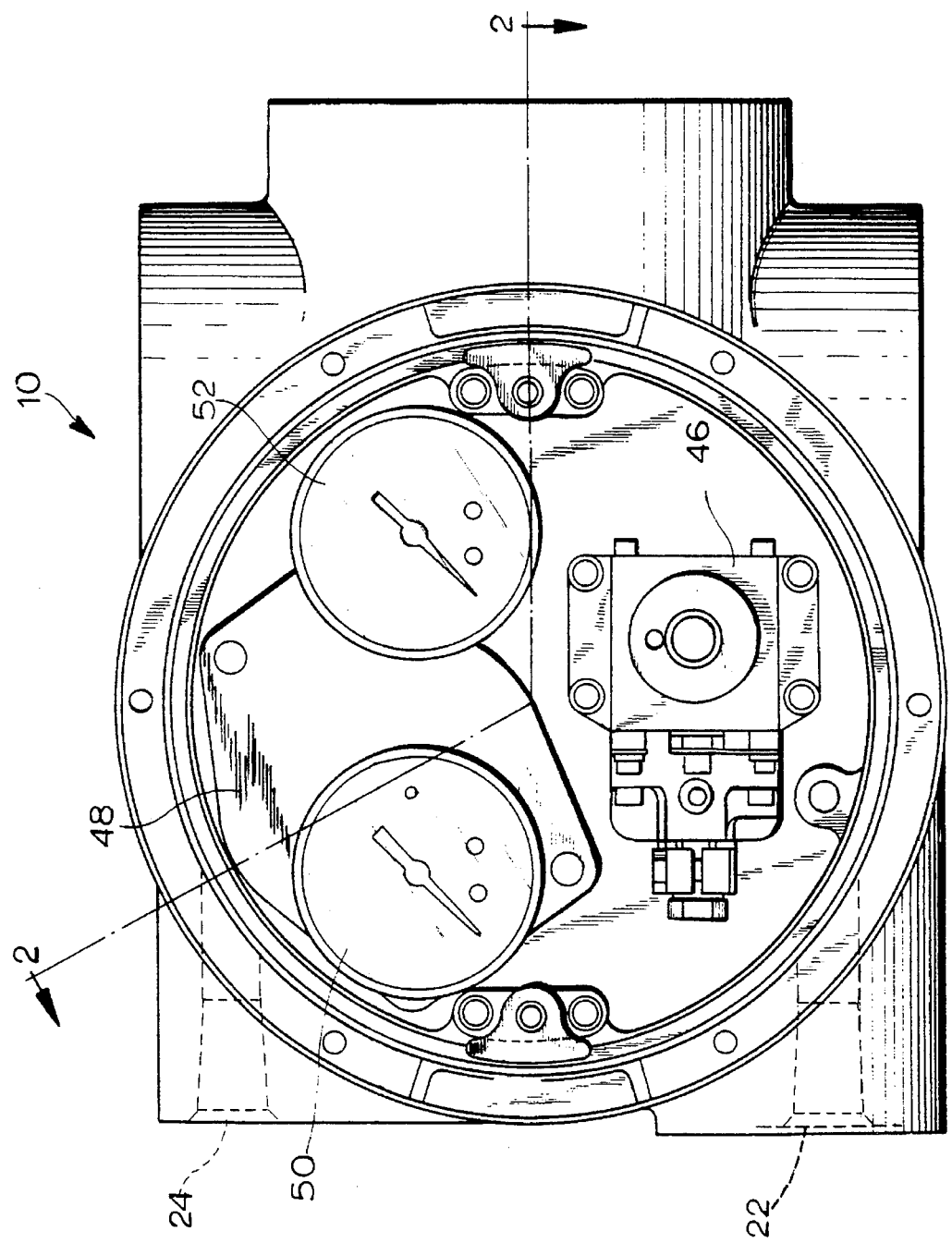
FIG. 1 is a front elevational view illustrating a current to pressure transducer/positioner.
Figure 2:
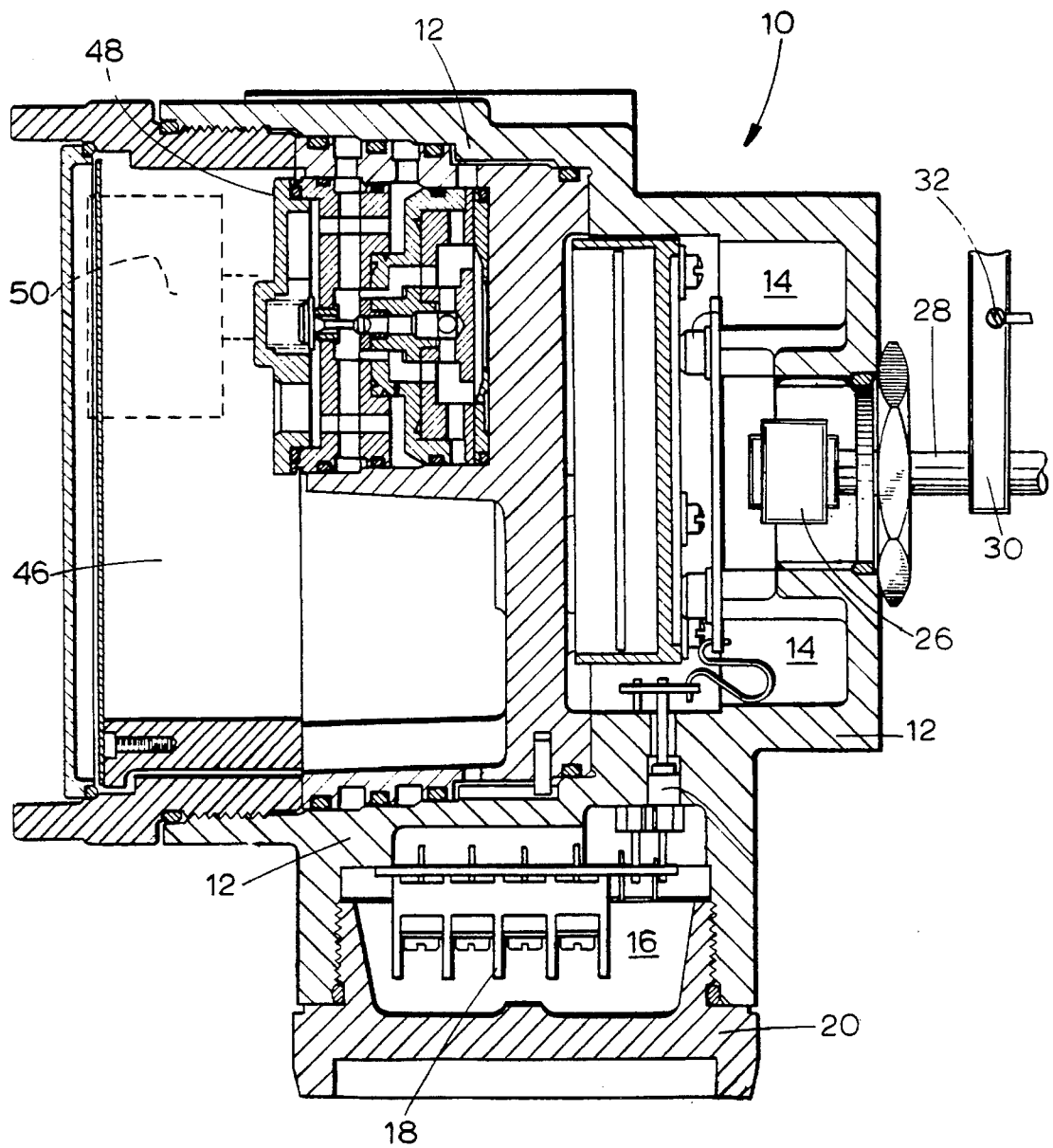
FIG. 2 is a cross-sectional view taken along section lines 2—2 of the current to pressure transducer/positioner shown in FIG. 1, with certain components removed for clarity.

Referring now to FIGS. 1 and 2, there is illustrated a current to pressure transducer/positioner having a housing 12 with one portion forming an enclosure defining a hollow interior 14. The housing 12 includes a field terminal box portion 16 including a field terminal strip 18 for suitable connection to an electrical signal cable for receiving a current control signal from a distributing control system, so as to for instance monitor a process. End cap 20 is removable from the housing so that the appropriate cable wiring connections can be made to terminal 18.

Housing 12 also includes an inlet 22 for receiving a supply pressure from a pneumatic supply source, and an outlet port 24 through which the output pressure can be suitably coupled to a positioner or directly to a valve actuator. Typically, in response to a variable 4–20 mA current control signal, current to pressure transducer/positioner 10 provides a variable pressure output at outlet 24.

Device 10 contains the electrical components and the pneumatic components required for operation of the device as a current to pressure transducer/ positioner. Typically, this will consist of a current to pressure converter device such as a I/P nozzle block 46 having a flapper for converting the variable current control signal input into a variable nozzle pressure signal; a pressure relay 48 receiving the variable nozzle pressure signal and providing a variable pressure output on outlet 24; a pressure gauge 50 monitoring the supply pressure coupled to inlet port 22; a second pressure gauge 52 monitoring the pressure output on outlet 24; and electronic equipment such as a pressure sensor and a printed circuit board with circuitry to process the electrical signals as required.

Figure 3A:
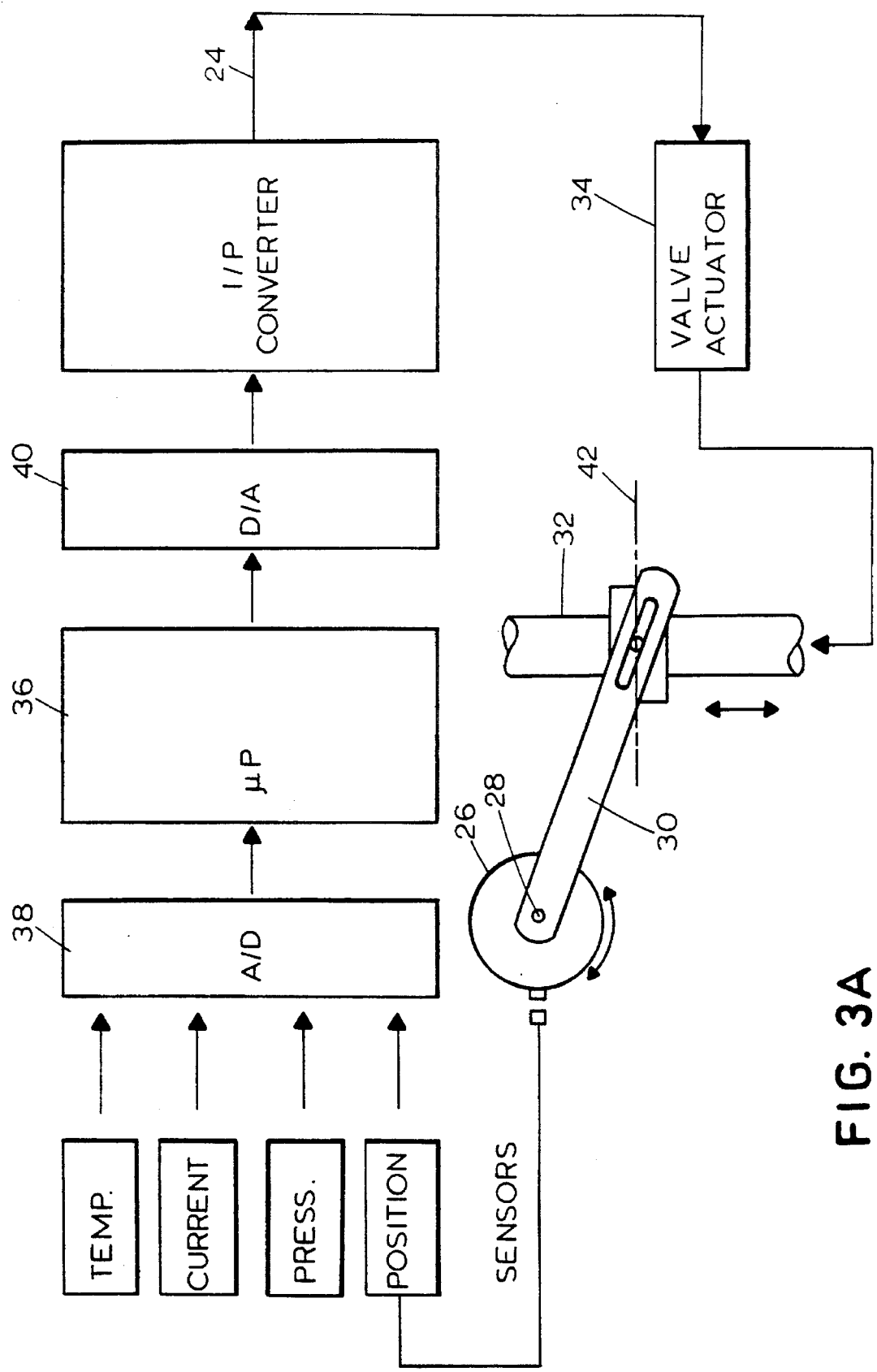
FIG. 3a is a schematic block diagram of a current to pressure positioner in accordance with the principles of the present invention.
Figure 3B:
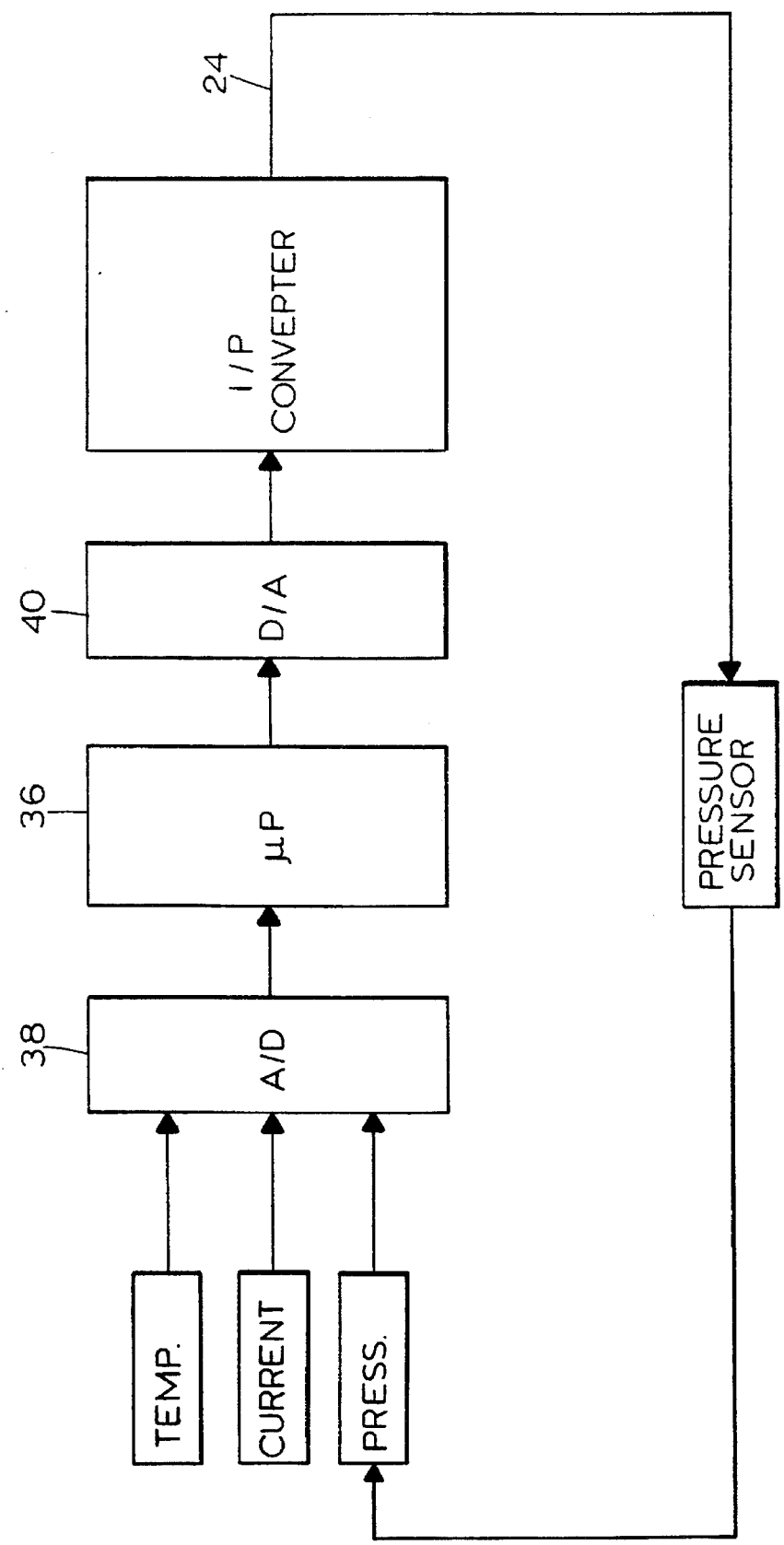
FIG. 3b is a schematic block diagram of a current to pressure transducer in accordance with the principles of the present invention.

A feedback position sensor potentiometer 26 has a shaft 28 coupled to positioner feedback linkage 30 which in turn is coupled to a fluid valve stem 32 for sensing the position of the valve stem being driven by a valve actuator 34. Reference may be made to FIGS. 3a and 3b, wherein there are illustrated block diagrams showing current to pressure positioner/transducer respectively in the overall configuration with a microprocessor 36, an analog to digital converter 38, and a digital to analog converter 40 to provide a pressure output signal on output port 24 of the I/P converter or position output of valve stem 32 of the I/P positioner. The device includes input sensors for monitoring input values of temperature, current, pressure or position as shown in FIGS. 3a and 3b.

Figures 4A, 4B, 4C:
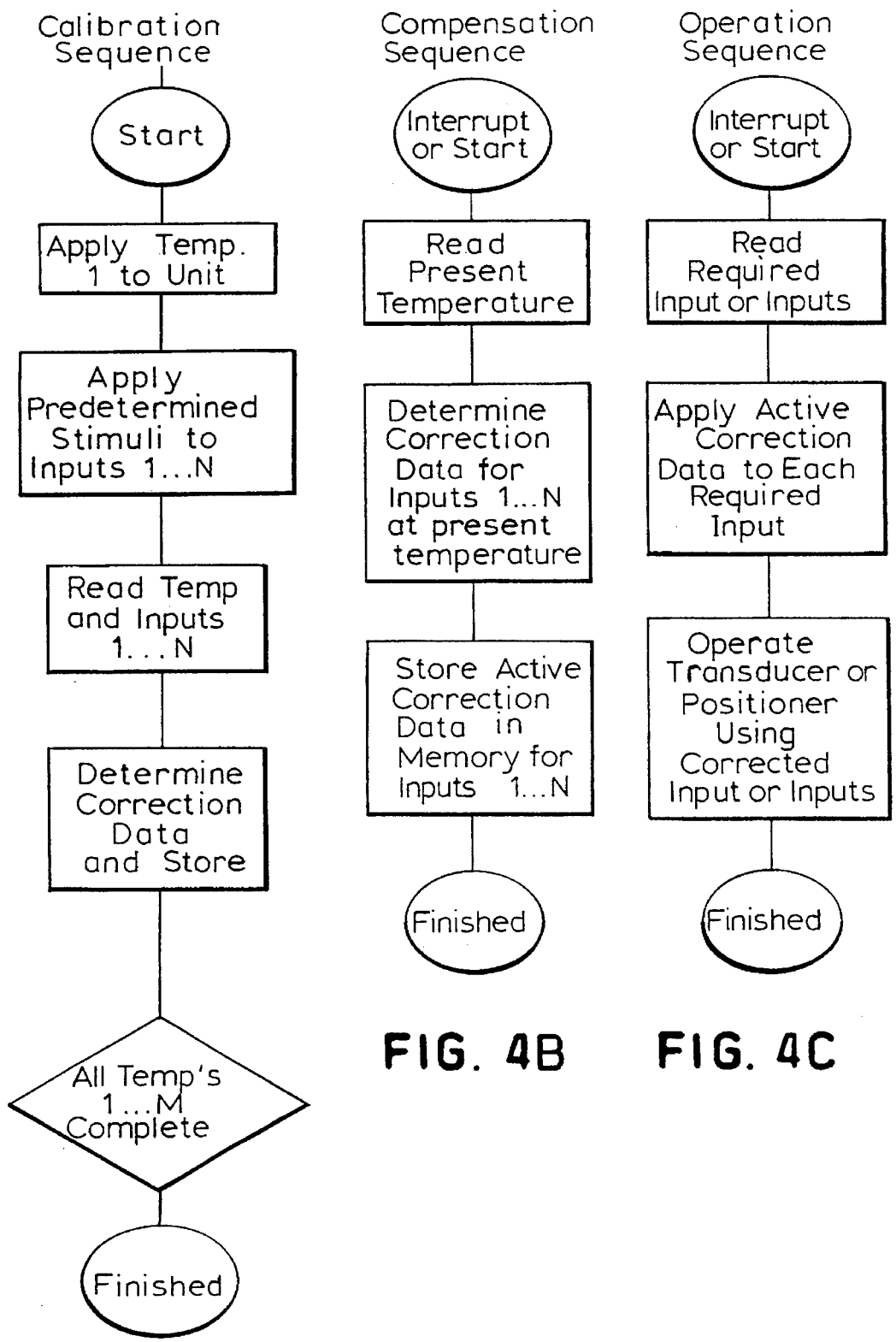
FIG. 4(a–c) is an information flow diagram of the steps involved in temperature compensation of the current to pressure transducer/positioner in accordance with one aspect of the present invention.

Referring to FIG. 4, there is illustrated a temperature compensation method for all input functions of the transducer or positioner in accordance with one aspect of the present invention. The method includes measuring of the internal temperatures as well as the various input values at various points over a specified operating range and storing compensation values so that in operation the device can correct for all temperature effects.

In particular, FIG. 4 shows a calibration sequence, a compensation sequence, and an operation sequence. In the calibration sequence, a first temperature is applied to the A/D converter 38 and predetermined known input values of current and pressure are applied to the A/D converter. Next, the actual temperature is sensed and read and in the next step a correction value is determined for the various inputs and stored. In the preferred technique for determining the correction values, for each input one . . . N (i.e. current, pressure, etc.), a comparison is made between the input value at the present temperature versus the input value at a reference temperature; a correction value or difference is calculated; and this correction value is stored. This determination of the correction value sub-sequence is continued by applying the next or second temperature as illustrated in the calibration sequence of FIG. 4 until all the temperatures have been completed. Accordingly, there has been thereby compiled a table of correction values with known calibration temperature relationships for the particular device.

Subsequently, after the electro-pneumatic converter device has been installed in the field, a compensation sequence of steps shown in FIG. 4 can be performed to compensate and thereby calibrate the device for the present temperature. As illustrated in FIG. 4, in the compensation sequence, the present temperature is sensed and read. Next, the correction value for the various inputs at the present temperature is determined from the table, and the active correction value for the various inputs is stored for later use. One technique for determining the correction value for the particular input at the present temperature is to read the correction values stored in the memory for two temperatures closest to the present temperature and interpolating an active correction value at the present temperature.

In the operation sequence shown in FIG. 4, the stored active correction values determined during the compensation sequence are read from memory for the required input and applied so that the transducer/positioner device can be operated using the corrected inputs.

Reference may be made to FIG. 5 which along with FIG. 3 shows a method for obtaining linearization of the output of the feedback sensor for corresponding movements of the valve stem. For instance, with reference to FIG. 3a, it can be seen that the pressure output on output port 24 may actuate a valve actuator 34 which as schematically illustrated drives a valve stem 32 in linear movement. The movement of valve stem 32 is coupled by position feedback linkage 30 coupled to shaft 28 of a feedback potentiometer 26 for indicating position values into the A/D converter 38. As shown in FIG. 3a, because of the non-linearity produced by the feedback linkage, some form of linearization must be provided. The present invention not only readily provides such linearization, but can do so with a minimum of effort so as to reduce the overall set up time compared to prior art devices.

With reference to FIG. 5, four methods are illustrated in FIGS. 5(a) through 5(d). In the preferred method of FIG. 5(a) there is indicated that the first step is mounting the positioner to the actuator which includes interconnecting valve actuator 34 and valve stem 32 with feedback linkage 30 and the feedback potentiometer 26. Next, the pressure output on line 24 is incremented by changing the input current signal until the positioner feedback linkage 30 is at a predetermined reference position which is at 90° to the valve stem. The reference axis line corresponding to the predetermined reference position is marked as line 42 in FIG. 3a.

The position feedback value is sensed by the position sensor and inserted so that the correct linearization value can be determined and stored in memory. The position feedback linearization value provides alignment of the linearization algorithm to the feedback linkage non-linearity so that the processed output of the positioner feedback linkage will provide an accurate linear reading of the actual valve position.

FIGS. 5(b) and 5(c) show alternative methods for adjusting of the positioner feedback linkage until the linkage is at the predetermined reference position as shown in FIG. 3. Thus, rather than incrementing the positioner output pressure as set forth in the method steps of FIG. 5(a), in FIG. 5(b) the adjustment is made using an independent pressure source. In FIG. 5(c) the adjustment of the positioner feedback linkage is made by a mechanical adjustment.

In the alternative method of linearization shown in FIG. 5(d), initially, a pre-established position feedback linearization value is stored in memory, and next the positioner is mounted to the actuator with the feedback linkage. Then, the positioner input is varied and the actuator position is independently measured to determine linearity. From the measured non-linearity, one can determine a corrected compensation—position feedback linearization value and an adjustment is then made in the pre-established value and stored in memory.

It is to be understood, that while the linearization method of FIG. 5(a) has been indicated as the preferred embodiment, the alternative linearization methods shown in FIGS. 5(b)–(d) can be chosen for particular usage and with certain advantages as desired.

Referring to FIG. 6, there is illustrated a calibration procedure and a configuration (independent of calibration)

procedure for electro-pneumatic positioners or transducers in accordance with another aspect of the present invention. FIG. 6 illustrates an initial calibration sequence when utilizing the microprocessor based current to pressure transducer/positioner 10 shown in FIGS. 3a and 3b. Initially, a reference input current, etc. is applied and the sensor inputs are read and stored in memory. Next, the drive values are determined for the unit which are required to achieve predetermined feedback values and from these drive values, positioning or pressure algorithm parameters are derived and stored in memory. Once the unit has been calibrated, the configuration values can be adjusted to the particular gain, and range values desired for the operation. Accordingly, the desired gain, action, input and feedback range values are communicated and stored.

Next, during operation, the independent use of configuration and calibration data is obtained in accordance with another aspect of the present invention. As shown in FIG. 6, initially the calibration values and the configuration values are read from memory. Next, the servo algorithm parameters are derived using the calibration and configuration values and the servo algorithm parameters are stored. Execution of the servo algorithm can then be provided using the parameters from the prior step.

In accordance with this aspect of the present invention, the input signal range or pneumatic output pressure or position range can be changed without recalibration of the control device. In addition, the gain of the servo algorithm used to control pneumatic output pressure or position can be changed without recalibration of the control device. As can be seen from FIG. 6, this is provided by the table of stored values containing known calibration relationships between input and output as initially determined in the calibration sequence of FIG. 6. Configuration values can be manipulated by the user in the configuration sequence without changing the known calibration relationships, such as changing the range of input—output relationship without the need for recalibration by deriving the required servo algorithm parameters in the operation sequence shown in FIG. 6.

The foregoing detailed description has been given for clearness of understanding only, and no unnecessary limitations should be understood therefrom, as modifications will be obvious to those skilled in the art.

We claim:

1. A configuration independent calibration method for an electro-pneumatic converter device having a microprocessor receiving an electrical input signal and a current to pressure converter coupled to the microprocessor for providing an output pressure signal, comprising the steps of:

initiating an initial calibration sequence including,
   (1) applying reference electrical input signals and reference feedback signals to said device;
   (2) reading said reference electrical input signals and said reference feedback signals and storing the readings as calibration reference values;
   (3) determining the drive output values required to obtain predetermined feedback values;
   (4) deriving calibration values corresponding to positioning algorithm parameter values using said drive output values;
   (5) storing said calibration values;

initiating a configuration sequence including;
   (6) entering and storing configuration values corresponding to at least one of gain, action, input and feedback range data; and initiating an operation sequence including,
   (7) reading said calibration values and the configuration values;
   (8) deriving updated servo algorithm parameter values using said calibration values and said configuration values; and
   (9) executing said servo algorithm.

2. A configuration independent calibration method according to claim 1, wherein said step (1) of initiating said initial calibration sequence includes applying reference electrical input signals to said device corresponding to temperature.

3. A configuration independent calibration method according to claim 1, wherein said step (1) of initiating said initial calibration sequence includes applying reference electrical input signals to said device corresponding to current.

4. A configuration independent calibration method according to claim 1, wherein said step (1) of initiating said initial calibration sequence includes applying reference electrical input signals to said device corresponding to temperature and current.

5. A configuration independent calibration method according to claim 4, wherein said step (1) of initiating said initial calibration sequence includes applying reference feedback signals to said device corresponding to position.

6. A configuration independent calibration method for a current to pressure transducer having a microprocessor receiving an electrical input signal and a current to pressure converter coupled to the microprocessor for providing an output pressure signal, comprising the steps of:

initiating an initial calibration sequence including,
   (1) applying reference electrical input signals and reference feedback signals to said current to pressure transducer;
   (2) reading said reference electrical input signals and said reference feedback signals and storing the readings as calibration reference values;
   (3) deriving calibration values corresponding to pressure control algorithm parameter values;
   (4) storing said algorithm parameter values;

initiating a configuration sequence including,
   (5) entering and storing configuration values corresponding to at least one of gain, input and feedback range data; and initiating an operation sequence including,
   (6) reading said calibrations values and the configuration values;
   (7) deriving updated servo algorithm parameter values using said calibration values and said configuration values; and
   (8) executing said servo algorithm.

7. A configuration independent calibration method according to claim 6, wherein said step (1) of initiating said initial calibration sequence includes applying reference electrical input signals to said current to pressure transducer corresponding to temperature.

8. A configuration independent calibration method according to claim 6, wherein said step (1) of initiating said initial calibration sequence includes applying reference electrical input signals to said current to pressure transducer corresponding to current.

9. A configuration independent calibration method according to claim 6, wherein said step (1) of initiating said initial calibration sequence includes applying reference electrical input signals to said current to pressure transducer corresponding to temperature and current.

10. A configuration independent calibration method according to claim 9, wherein said step (1) of initiating said initial calibration sequence includes applying reference feedback-signals to said current to pressure transducer corresponding to pressure.

11. A configuration independent calibration method for a current to pressure transducer having a microprocessor receiving an electrical input signal and a current to pressure converter coupled to the microprocessor for providing an output pressure signal, comprising the steps of:

initiating an initial calibration sequence including,
(1) applying reference electrical input signals and providing reference feedback conditions to said device;
(2) reading said reference electrical input signals and said reference feedback conditions and storing the readings as calibration reference values;
(3) deriving calibration values corresponding to pressure control algorithm parameter values;
(4) storing said algorithm parameter values;

initiating a configuration sequence including,
(5) entering and storing configuration values corresponding to at least one of gain, input and feedback range data; and initiating an operation sequence including,
(6) reading said calibration values and the configuration values;
(7) deriving updated servo algorithm parameter values using said calibration values and said configuration values; and
(8) executing said servo algorithm.

12. A configuration independent calibration method for a current to pressure transducer having a microprocessor receiving an electrical input signal and a current to pressure converter coupled to the microprocessor for providing an output pressure signal, comprising the steps of:

initiating an initial calibration sequence including,
(1) deriving calibration values corresponding to pressure control algorithm parameter values;
(2) storing said algorithm parameter values;

initiating a configuration sequence including,
(3) entering and storing configuration values corresponding to at least one of gain, input and feedback range data; and initiating an operation sequence including,
(4) reading said calibration values and the configuration values;
(5) deriving updated servo algorithm parameter values using said calibration values and said configuration values; and
(6) executing said servo algorithm.

13. A configuration independent calibration method for an electro-pneumatic converter device having a microprocessor receiving an electrical input signal and a current to pressure converter coupled to the microprocessor for providing an output pressure signal, comprising the steps of:

initiating an initial calibration sequence including,
(1) applying reference electrical input signals and reference feedback signals to said device;
(2) reading said reference electrical input signals and said reference feedback signals and storing the readings as calibration reference values;
(3) deriving calibration values corresponding to positioning algorithm parameter values;
(4) storing said calibration values;

initiating a configuration sequence including,
(5) entering and storing configuration values corresponding to at least one of gain, input and feedback range data; and initiating an operation sequence including,
(6) reading said calibration values and the configuration values;
(7) deriving updated servo algorithm parameter values using said calibration values and said configuration values; and
(8) executing said servo algorithm.

14. A configuration independent calibration method for an electro-pneumatic converter device having a microprocessor receiving an electrical input signal and a current to pressure converter coupled to the microprocessor for providing an output pressure signal, comprising the steps of:

initiating an initial calibration sequence including,
(1) applying reference electrical input signals and providing reference feedback conditions to said device;
(2) reading said reference electrical input signals and said reference feedback conditions and storing the readings as calibration reference values;
(3) deriving calibration values corresponding to positioning algorithm parameter values;
(4) storing said calibration values;

initiating a configuration sequence including,
(5) entering and storing configuration values corresponding to at least one of gain, input and feedback range data; and initiating an operation sequence including,
(6) reading said calibration values and the configuration values;
(7) deriving updated servo algorithm parameter values using said calibration values and said configuration values; and
(8) executing said servo algorithm.

15. A configuration independent calibration method for an electro-pneumatic converter device having a microprocessor receiving an electrical input signal and a current to pressure converter coupled to the microprocessor for providing an output pressure signal, comprising the steps of:

initiating an initial calibration sequence including,
(1) deriving calibration values corresponding to positioning algorithm parameter values;
(2) storing said calibration values;

initiating a configuration sequence including,
(3) entering and storing configuration values corresponding to at least one of gain, input and feedback range data; and initiating an operation sequence including,
(4) reading said calibration values and the configuration values;
(5) deriving updated servo algorithm parameter values using said calibration values and said configuration values; and
(6) executing said servo algorithm.

* * * * *